Aug. 3, 1937.   E. T. GREGORIE   2,088,787
MOTOR VEHICLE
Filed Jan. 28, 1937   2 Sheets-Sheet 1

INVENTOR.
E. T. Gregorie
BY
ATTORNEY.

Aug. 3, 1937.   E. T. GREGORIE   2,088,787
MOTOR VEHICLE
Filed Jan. 28, 1937   2 Sheets-Sheet 2

INVENTOR.
E. T. Gregorie
BY
ATTORNEY.

Patented Aug. 3, 1937

2,088,787

UNITED STATES PATENT OFFICE 2,088,787

MOTOR VEHICLE

Eugene T. Gregorie, Plymouth, Mich., assignor to Ford Motor Company, Dearborn, Mich., a corporation of Delaware Application January 28, 1937, Serial No. 122,760

4 Claims. (Cl. 180—77)

The object of my invention is to provide a motor vehicle having a conventional selective gear type transmission therein, the gear shift lever of which is both concealed from view and protected from contact with passengers in the car.

In the past there have been many attempts made to mount gear shift levers on the instrument board of a vehicle and, by means of flexible cables and the like, to connect this lever with the transmission of the vehicle to operably shift same. None of these devices has proved satisfactory for the reason that the cables if flexible would allow excessive lost motion or if made rigid enough to prevent this would transmit noise to the instrument panel. The panel in these cases would vibrate in synchronism with the transmission to thereby amplify the gear noise therein.

The purpose of my invention is to extend the gear shift lever from the transmission to the lower part of the instrument panel, the intermediate portion of the lever being concealed by a housing which extends downwardly from the instrument panel to the transmission. Thus, the gear shift lever has no connection with the instrument panel and cannot transmit transmission vibration thereto. The lever does, however, appear to project outwardly from the lower part of the instrument panel.

The intermediate portion of the lever being enclosed it is protected from striking when shifted against the knees of passengers in the car. This is a decided advantage in the present day automobile which is constructed to accommodate three persons in the front seat. The lower portion of the lever being enclosed, it is also prevented from soiling wearing apparel of the driver or passengers. The conventional gear shift lever installation was a source of trouble in this respect as the universal joint between the transmission tower and the lever required oiling which in most cases collected on the side of the tower, collecting dust and forming a potential source of trouble in this respect.

Still a further object of my invention is to offset the upper portion of the gear shift lever towards the driver of the car so as to make the shifting of the transmission more convenient, especially with three persons in the front seat.

With these and other objects in view my invention consists in the arrangement, construction, and combination of the various parts of my improved device, as described in this specification, claimed in my claims, and illustrated in the accompanying drawings, in which:

Figure 1:
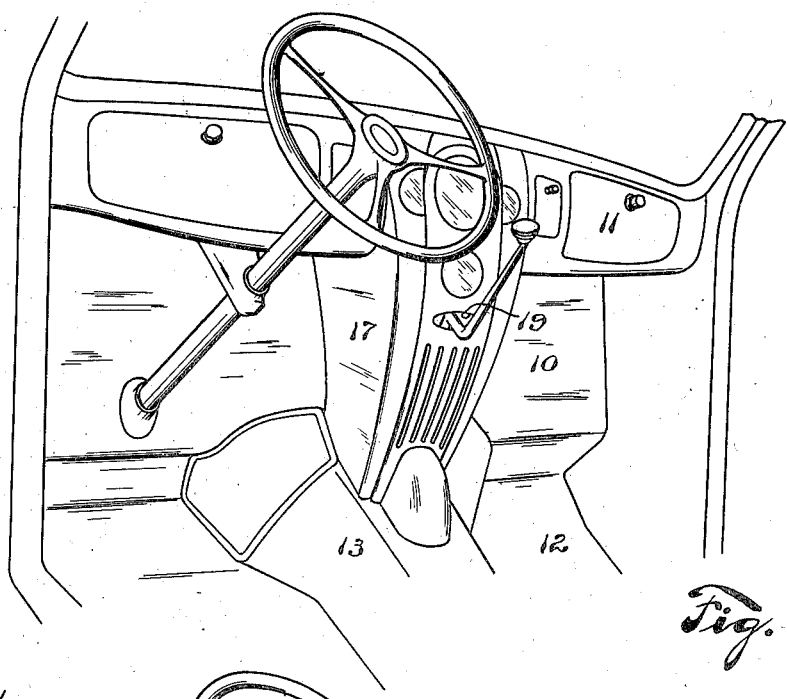
Figure 1 is a perspective view of the instrument board of a motor vehicle having my improved gear shift mechanism installed thereon.

Referring to the accompanying drawings, I have used the reference numeral 10 to indicate a vertical dash which extends upwardly from the forward end of a vehicle body. A cowl 26 extends from the dash 10 rearwardly and an instrument board 11 extends transversely across the vehicle just beneath the rear edge of this cowl in a conventional manner. A floor 12 is provided, which floor has a longitudinally extending tunnel portion 13 formed therein. The function of the tunnel 13 is to provide a closure over a transmission 14. The transmission 14 is of the conventional sliding gear type and is provided with a tower 15 extending upwardly therefrom, the upper end of the tower forming a universal fulcrum for a gear shift lever 16 which is mounted in the tower and which extends down into the transmission in the conventional manner.

Figure 2:
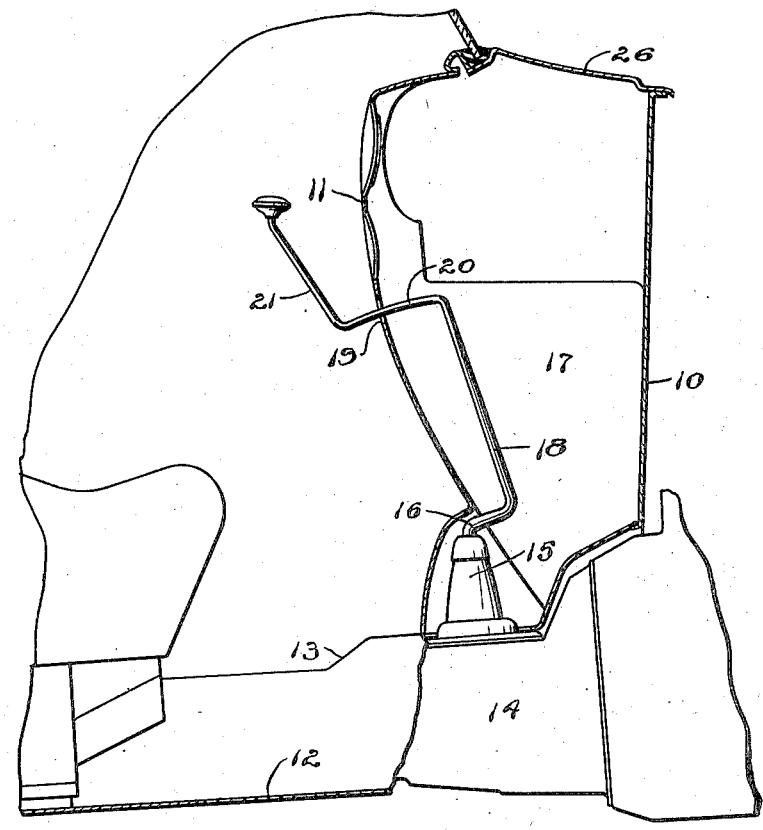
Figure 2 is a vertical central sectional view taken through the instrument panel, shown in Figure 1.

A box shaped housing 17 extends from the instrument panel forwardly to the dash 10 and down to the tunnel 13 to thereby form a vertical housing through which the portion 18 of the gear shift lever extends. Referring to Figures 1 and 2, the gear shift lever just above the tower 15 is offset forwardly as seen at 16, and extends upwardly through the housing 17 to a position adjacent to the bottom of the instrument board. It will be noted that the front face of the housing 17 is provided with a transverse slot 19 therein just slightly below the bottom of the instrument panel. That part of the lever beyond the portion 18 is bent rearwardly as at 29 so as to extend through the slot 19 and the rear end of the portion 20 extends upwardly at 21 to position about in line with the center of the instrument panel.

The gear shift lever may thus be moved forwardly or rearwardly without contacting the housing 17, by reciprocating the portion 20 through the slot 19. The lever may also be moved laterally without binding, the slot 19 being sufficiently long for this purpose.

Thus, the transmission may be shifted in the conventional manner while the driver and passengers are protected from the dirt and grease which ordinarily accumulate at the upper portion of the transmission tower. Furthermore, the passengers' knees do not get in the way of the shift lever providing a considerable advantage when three persons are riding in the front seat of the car.

Figure 3:
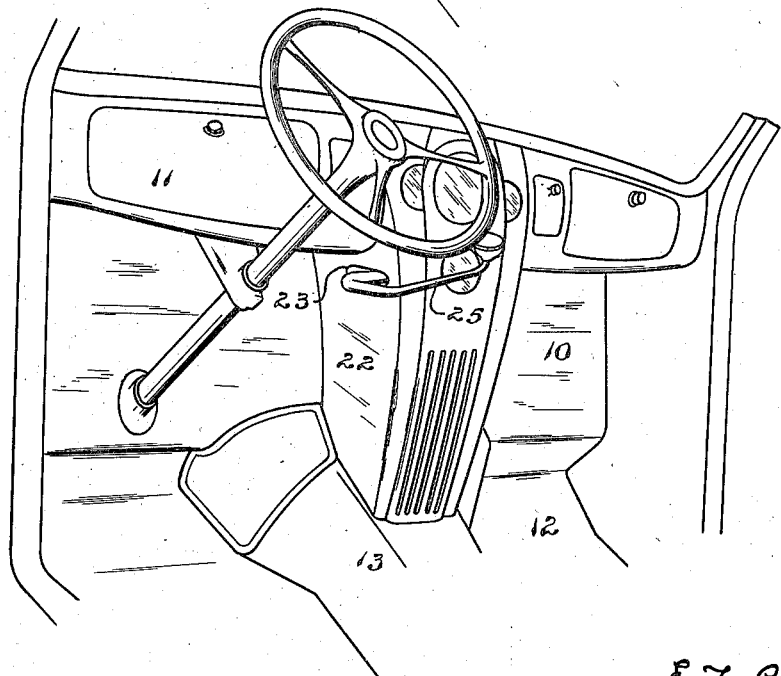
Figure 3 is a perspective view of a second form of my improved device.
Figure 4:
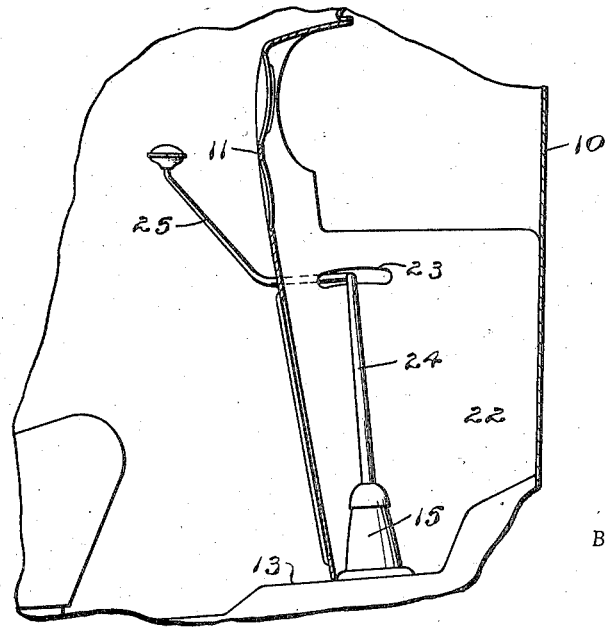
Figure 4 is a vertical, central, sectional view, taken through the instrument panel, shown in Figure 3.

Referring to Figures 3 and 4, an alternate construction is shown. In this construction a housing 22 extends between the tunnel 13 and the instrument board 11, which housing is provided with a longitudinally extending slot 23 formed in the side thereof adjacent to the driver.

The gear shift lever used with this construction has a straight portion 24 extending upwardly from the top of the tower 15 to a position adjacent to the slot 23. At this point the lever is bent to extend transversely towards the driver's side of the car through the slot 23. The outer end is then bent rearwardly and upwardly as at 25. This construction is particularly suitable for use in cars having a wide front seat, as it brings the operative end of the gear shift lever closer to the driver and thus allows more room for passengers in the front seat.

Among the many advantages arising from the use of my improved construction it may be well to mention that the passengers and driver of the car are protected from dirt and oil which invariably accumulate on the upper portion of the gear shift tower.

Still further, the passengers are protected against being struck on the knees by the gear shift lever, which has been a source of annoyance with the conventional gear shift levers where three persons are riding in the front seat.

Still further, my improved device has a novel and pleasing appearance which in the actual construction adds much to the appearance of the car.

Some changes may be made in the arrangement, construction and combination of the various parts of my improved device without departing from the spirit of my invention, and it is my intention to cover by my claims such changes as may reasonably be included in the scope thereof.

I claim as my invention:

1. In a motor vehicle, a vehicle body having a cowl disposed at the forward end thereof, an instrument board extending transversely across the rear portion of said cowl, a tunnel formed in the bottom of said body directly beneath said instrument board, a transmission disposed in said tunnel for effecting various driving speed ratios for said vehicle, a housing extending from said instrument board downwardly to said tunnel, and a control lever for said transmission extending upwardly therefrom through said housing to a point adjacent to the lower edge of said instrument board, said lever being bent laterally at said point where it extends outwardly from said housing through a suitable slot formed therein, the outwardly projecting end of said lever being movable in two directions relative to said housing, for the purpose described.

2. In a motor vehicle, a vehicle body having a cowl at the forward end thereof, the forward end of said cowl having a dash extending downwardly to form a closure for the front end of the vehicle body, an instrument board extending transversely across the rear portion of said cowl, a tunnel formed in the bottom of said body directly beneath said instrument board, a transmission disposed in said tunnel for effecting several driving speed ratios for said vehicle, a housing extending from said instrument board downwardly to said tunnel, said dash forming one wall of said housing with the opposite wall thereof being substantially flush with said instrument board, and a control lever for said transmission extending upwardly therefrom through said housing to a point adjacent to the lower edge of said instrument board, said lever being bent horizontally at said point, said horizontal portion extending outwardly from said housing through a suitable slot formed therein at said point, the projecting end of said lever being movable in two directions relative to said housing, for the purpose described.

3. In a motor vehicle, a vehicle body having a dash extending vertically across the forward end thereof, a cowl secured to the upper part of said dash, an instrument board extending transversely across the rear portion of said cowl, a tunnel formed in the bottom of said body directly beneath said instrument board, a transmission disposed within said tunnel for effecting various driving speed ratios for said vehicle, a sheet metal housing of box section extending from said instrument board downwardly to said tunnel, said dash forming the forward wall of said housing, and a control lever for said transmission extending therefrom upwardly through said housing to a point adjacent to the lower edge of said instrument board, said housing having a horizontal slot therein beneath said instrument board, the upper end of said lever being bent horizontally so as to extend through said slot, the end of said lever outside of said housing being bent upwardly so as to be in convenient position for operation by the driver of the vehicle.

4. In a motor vehicle, a vehicle body having a cowl at the forward end thereof, a vertically extending dash forming a closure for the forward end of said cowl, an instrument board extending transversely across the rear end of said cowl, a tunnel formed in the bottom of said body directly beneath said instrument board, a transmission disposed in said tunnel for effecting various driving speed ratios for said vehicle, a sheet metal housing of rectangular cross section extending from said instrument board downwardly through said tunnel, said dash forming the forward wall of said housing with the opposite wall thereof being substantially flush with said instrument board, and a control lever for said transmission extending therefrom upwardly through said housing to a point adjacent to the lower edge of said instrument board, said lever being bent laterally at said point, said lateral portion extending outwardly from said housing through a horizontal slot formed in the side wall of said housing adjacent to the driver of the vehicle, the end of the projecting portion of said lever being bent rearwardly so as to be in convenient position for actuation by the driver of the vehicle.

EUGENE T. GREGORIE.